(12) United States Patent
Kretz et al.

(10) Patent No.: US 8,673,422 B2
(45) Date of Patent: Mar. 18, 2014

(54) PROCESS FOR ENCAPSULATING AN ELECTRO-OPTICAL DEVICE

(75) Inventors: Thierry Kretz, Saint Jean de Moirans (FR); Bernard Meunier, Saint Etienne de Saint Geoirs (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 13/591,075

(22) Filed: Aug. 21, 2012

(65) Prior Publication Data
US 2013/0083387 A1 Apr. 4, 2013

(30) Foreign Application Priority Data
Sep. 30, 2011 (FR) ...................................... 11 02966

(51) Int. Cl.
*G11B 7/24* (2013.01)
(52) U.S. Cl.
USPC .......... 428/64.1; 428/64.4; 349/122; 349/125; 156/275.5
(58) Field of Classification Search
USPC ........ 428/64.4; 349/122, 125, 155; 156/275.5
See application file for complete search history.

(56) References Cited

U.S. PATENT DOCUMENTS

| 8,468,712 | B2 * | 6/2013 | Nguyen ........................ 34/122 |
| 2009/0011197 | A1 | 1/2009 | Matsuhira |
| 2009/0183819 | A1 | 7/2009 | Matsuhira |
| 2010/0272933 | A1 * | 10/2010 | McCormick et al. ........ 428/34.1 |
| 2010/0296027 | A1 | 11/2010 | Matsuhira et al. |
| 2011/0007391 | A1 | 1/2011 | Takahashi |
| 2012/0006466 | A1 * | 1/2012 | Galstian et al. ............... 156/146 |

* cited by examiner

*Primary Examiner* — Elizabeth Mulvaney
(74) *Attorney, Agent, or Firm* — Baker & Hostetler LLP

(57) ABSTRACT

A process for protecting the external face of an electro-optical device, the external face comprising at least one optical film adhesively bonded to a transparent substrate and set back therefrom, comprises encapsulating the optical element between the substrate and a transparent cover that is substantially the same size as the substrate. The process comprises adhesive bonding of the cover, the adhesive bonding being achieved by depositing uncured adhesive in two steps, namely a first step that is used first to take up the step difference between the substrate and the optical element, and a second step that is used to adhesively bond the protective cover. Smaller respective thicknesses of adhesive shrink in each step and thus, in the end, the total shrinkage is limited and the quality of the product is improved.

7 Claims, 2 Drawing Sheets

PROCESS FOR ENCAPSULATING AN ELECTRO-OPTICAL DEVICE

CROSS-REFERENCE TO RELATED APPLICATION

This application claims priority to foreign French patent application No. FR 1102966, filed on Sep. 30, 2011, the disclosure of which is incorporated by reference in its entirety.

FIELD OF THE INVENTION

The invention relates to electro-optical devices used in harsh environments, these devices being provided with a superficial optical film or optical film multilayer, bonded to a transparent substrate but set back from the edge of the substrate, which devices require appropriate encapsulation of this or these optical films.

The invention more particularly relates to electro-optical devices that are affected by thickness variations introduced by mechanical stresses that result from this encapsulation, and notably to devices based on an electro-optical fluid: liquid crystals, electro-wetting material, electronic ink, etc.

BACKGROUND

It is a question of protecting the optical film or film multilayer from attack due to the operating environment: moisture, pollution, heat, etc., by superposing and adhesively bonding a transparent protective cover that is substantially the same size as the transparent substrate to which the film or film multilayer is adhesively bonded, the film or film multilayer being set back from the edge. The encapsulation has the technical effect of preserving the optical properties of these one or more films over time. It furthermore allows the device to be reinforced with a cover that may be relatively thick and relatively stiff. This effect is commonly obtained by enclosing the optical film or film multilayer between the substrate and a protective cover of corresponding dimensions. The cover is made of an optically transparent material, for example of glass. It is adhesively bonded on top of the substrate and the film or film multilayer using a layer of transparent adhesive having a suitable refractive index. This adhesive layer covers the surface of the film or film multilayer, and its edge face around its entire circumference. The edge face of the film or films is thus protected from moisture by the adhesive, which forms a seal, and the protective cover above, which furthermore acts to strengthen the structure. By way of example, a liquid-crystal display, also called an LCD, is described hereafter. The basic structure of such a display is illustrated in FIG. 1. It comprises a liquid-crystal layer 3 enclosed between two transparent substrates 1 and 2, and a polarizing optical film on the external face of each substrate. The back side, though which the display receives the light flux, which will be modulated by way of suitable electrical control of the liquid-crystal layer, is formed by the back substrate 1 and by the polarizing film 9 placed on the external face of the substrate, set back from the edge. The front side, on which a resulting image will form, comprises the front substrate 2 and the polarizing film 4 placed on the external face of the substrate, set back from the edge.

In the example, a protective cover 6 is adhesively bonded to the front side by means of an adhesive layer 5 that covers the optical film 4 and the parts $2_{ZP}$ of the front substrate exceeding the optical film 4.

To adhesively bond the protective cover 6 to the front side of such a display comprising an optical film 4 set back from the edge of the front substrate 2, two methods may be used.

A first method employs an adhesive to laminate the protective cover 6 to the front side. However this method assumes that hot-melt lamination is possible. This is because it is necessary to melt the adhesive in order to completely fill the space between the front substrate 2 and the cover 6 in the parts $2_{ZP}$ of the substrate that exceed the optical film. It is furthermore necessary to carry out this hot-melt lamination under vacuum so as to prevent air bubbles from being trapped under the cover. This method thus requires complex and therefore expensive equipment.

Moreover, laminating adhesives in practice take the form of thin strips typically about 50 µm in thickness, whereas the optical film is closer to about 250 µm in thickness. To sufficiently relax the mechanical stresses on the display, and to obtain a good coverage of the edge face of the optical film, it is necessary to laminate a number of layers of adhesive in succession. Thus this method, which at first glance would appear to be advantageous because it is simple to implement, in practice turns out to be expensive.

Another method employs deposition of an uncured adhesive of suitable viscosity. This method has the advantage of being implemented at room temperature and atmospheric pressure. It provides a uniform joint between the cover and the display, the interface with the optical film being free from bubbles.

However, this method has a major drawback: the curing, or polymerization, of the adhesive, conventionally carried out under UV or with heat, causes the adhesive to shrink in every direction and notably therefore in the thickness direction. This shrinkage may be about 10%. On account of the small thicknesses concerned (relative to the dimensions of the area of the front side) and of the step difference between the optical film and the substrate to which the optical film is adhesively bonded, the shrinkage of adhesive in the thickness direction is critical and leads to mechanical stresses that are liable to damage the product.

To illustrate this problem, consider, as indicated in FIG. 2, which is a partial view of the schematic cross section in FIG. 1, a 250 µm-thick optical film. Assuming the deposition of adhesive is carried out so as to obtain a final adhesive thickness of about 200 µm on the optical film, the thickness of adhesive around the optical film, between the parts $2_{ZP}$ of the substrate that exceed the optical film and the cover 6, must be about 450 µm.

Above the optical film, curing causes the adhesive to shrink 20 µm, i.e. 10% of 200 µm.

Above the substrate, in the parts $2_{ZP}$ exceeding the optical film, the adhesive shrinks 45 µm, i.e. 10% of 450 µm.

There is therefore a difference in the adhesive thickness between the active zone above the optical film and the peripheral zone, which difference is about 25 µm.

In practice, depending on the thickness of adhesive, the stiffness of the display, the material of the protective screen and its thickness, the mechanical stresses, which will naturally act to compensate this difference, may have various effects, which may be combined, notably:

strain in the display, this strain then leading to a variation in the thickness of the liquid crystal at the periphery of the active zone, degrading the appearance of the product;
  delamination of the encapsulation at the adhesive/substrate and/or adhesive/cover interface, thus making it easier for moisture to penetrate and therefore adversely affecting the reliability of the final product; and introduction of localized bubbles at the periphery of the optical film, degrading the appearance of the product or even its reliability if these bubbles reach the edge of the substrate, which may notably be the case when the distance between the edge of the optical film and the edge of the substrate is small.

Thus, techniques for adhesively bonding a protective cover to a face of an electro-optical device, which face is not perfectly flat but comprises a height difference due to the presence of an optical film or film multilayer that is adhesively bonded to a substrate but set back from the edge, cause mechanical stresses which affect the quality of the finished product.

SUMMARY OF THE INVENTION

The invention provides a method for protecting an electro-optical device that does not have the aforementioned disadvantages and drawbacks.

It is based on the adhesive deposition principle, but this deposition is carried out in two steps, a first step for first taking up the step difference between the substrate and the optical film and a second step for adhesive bonding of the protective cover. Smaller respective thicknesses shrink in each step and thus, in the end, the total shrinkage is much more limited and the quality of the product is greatly improved.

The invention thus relates to a process for protecting an external face of an electro-optical device, the external face comprising an optical element formed by an optical film or an optical film multilayer, said element being adhesively bonded to an optically transparent substrate and set back from the edge of the substrate, the protection process comprising encapsulating the optical element by adhesively bonding an optically transparent protective cover to the external face of the device, the areas of the cover and of the substrate being substantially the same, characterized in that the adhesive bonding of the cover comprises depositing adhesive beforehand, said deposition being carried out in two steps, namely:
  a first step comprising deposition of uncured adhesive on the surface of the parts of the substrate that extend beyond the optical element, followed by curing, thus forming a marginal adhesive strip that extends from the edge of the optical element to the edge of the substrate and that takes up the height difference between the substrate and the optical film; and
  a second step of bonding the protective cover, comprising deposition of uncured adhesive on the surface of the entire front side of the device, adhesively bonding the cover and curing.

BRIEF DESCRIPTION OF THE DRAWINGS

Other features and advantages of the invention will become apparent on reading the following detailed description, given with reference to the appended drawings in which.

DETAILED DESCRIPTION

Figure 3:
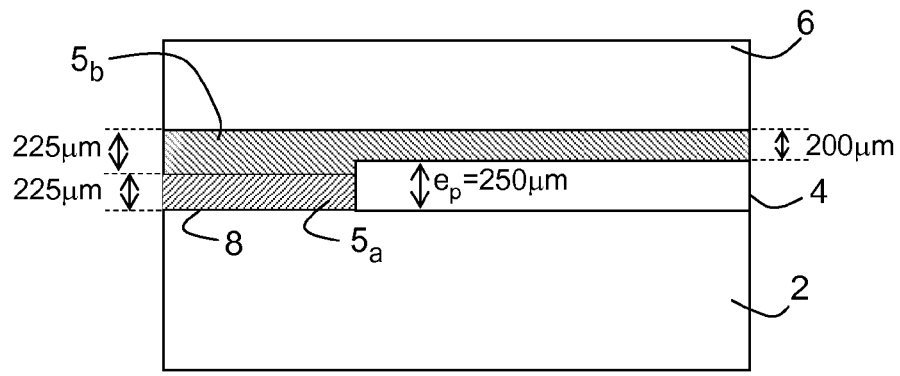
FIG. 3 illustrates the principle of a process for protecting an optical element, located on an external face of an electro-optical device, with a two-step adhesive deposition according to the invention, the two-step deposition forming two layers of adhesive and allowing the final shrinkage to be reduced while covering the optical film and filling the space, in the peripheral zone surrounding the optical element, between the cover and the substrate.
Figure 4:
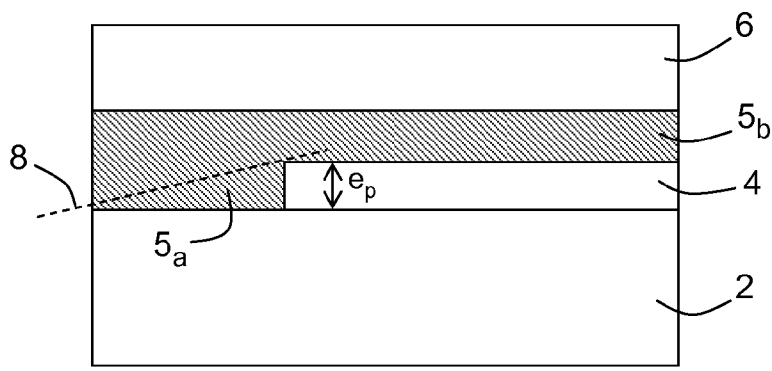
FIGS. 4 and 5 illustrate two variant embodiments of the process of the invention, one more particularly applicable to small devices with a narrow peripheral zone, and the other more particularly applicable to larger devices, in which the peripheral zone is wider.

A process for protecting an external face of an electro-optical device, the external face comprising an optical element formed by an optical film or film multilayer bonded to an optically transparent substrate and set back from the edge of the substrate, is described with regard to FIGS. 3 and 4.

It will be noted that the expression "optical film" is understood to mean an element having purely optical properties, such as a polarizing film or a film for widening the viewing angle, and also an element having electro-optical properties, for example an organic photovoltaic polarizing film—which is an optical polarizing film that furthermore generates electricity from natural light. Used, for example, as an optical polarizing film in an LCD, this film provides the additional functionality of generating electricity from the backlighting of the LCD.

An optical film multilayer is formed by adhesively bonding, using any appropriate technique, several, at least two, optical films to one another, each film providing the device with additional functionalities.

FIG. 3 illustrates the two-step adhesive deposition principle of a protection process according to the invention applied to the external face of an electro-optical device. This external face comprises an optical element 4 adhesively bonded to a transparent substrate 2 and set back from the edge of the substrate. The protection consists in adhesively bonding an optically transparent cover 6 to this external face. The stiffness and thickness of the cover depend on the electro-optical device considered.

Figure 1:
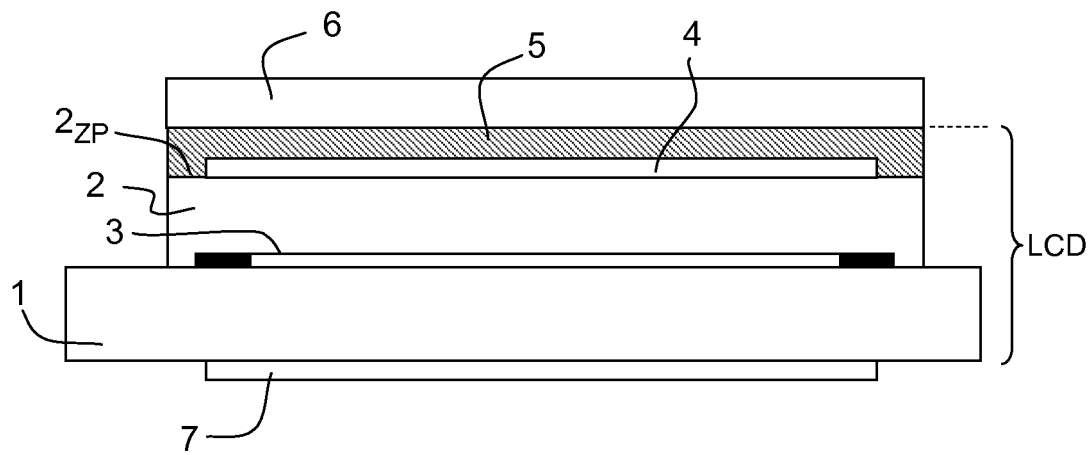
FIG. 1 shows a transverse cross-sectional view of an LCD with a protective cover on the front side.
Figure 2:
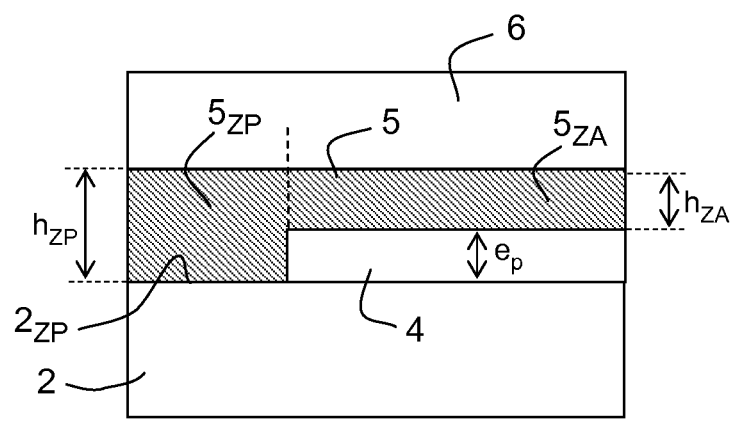
FIG. 2 shows a partial view of FIG. 1, detailing the various thicknesses of the adhesive layer relative to the thickness of the optical film.

According to the invention, to carry out this bonding, a first adhesive layer $5_a$ is produced by depositing uncured adhesive around the optical element, on the zone $2_{ZP}$ of the substrate 2 exceeding the optical element. The thickness of deposited adhesive substantially corresponds to the thickness $e_p$ of the optical element, so that the step difference between the substrate and the optical element is filled, in the peripheral zone around the optical element. If the numbers of the example in FIGS. 1 and 2 are considered again, for an optical element having a thickness $e_p$=250 µm and for an adhesive that shrinks by 10% when cured, the thickness of this first layer shrinks by 25 µm. The thickness of this layer is therefore 225 µm after curing.

A second adhesive layer $5_b$ is then produced by depositing uncured adhesive on top of the first adhesive layer and the optical element, and the cover is placed onto this second adhesive layer. A new curing operation is then carried out.

If the above example, illustrated by FIG. 2, in which 200 µm of adhesive is deposited on the optical element, is considered again, there will then be a thickness of 225 µm of adhesive on the first layer, as illustrated in FIG. 3, which schematically shows the shrinkage of the first layer.

After this second layer has been cured a shrinkage of 22.5 µm in the thickness direction will be observed in the peripheral region around the optical element, and a shrinkage of 20 µm in the thickness direction will be observed above the optical element: the difference in adhesive thickness between the peripheral zone and the zone above the optical element is therefore now only 2.5 µm.

The two-step adhesive deposition/curing therefore allows shrinkage of the adhesive, and therefore the mechanical stresses in the finished product, to be considerably decreased. The process proposed is therefore very advantageous.

Preferably, the same adhesive is used in both steps, thereby reducing the risks of delamination or of problems at the interface where the two adhesive layers meet.

The external face of the optical element is commonly coated with a protective film. This protective film will be kept in place during the first step and removed before the second step, thereby allowing any surplus adhesive that may get deposited on the surface of the optical element to be easily removed.

In the first step, and in the case where the space between the edge of the optical element and the edge of the substrate is narrow, for example about 1 mm, the process will for example be carried out in the following way: a bead of adhesive having a calibrated volume will be deposited around the optical element. The adhesive thus deposited will progressively spread (depending on its viscosity coefficient) and fill the entire space between the edge of the optical element and the edge of the substrate. A first layer having a substantially uniform thickness is obtained filling this space.

A possible variant, illustrated in FIG. 4, consists in depositing a bead of adhesive around the optical element, which bead is then bevelled from the edge of the optical element toward the edge of the substrate, taking as references the corners of the optical element and the substrate. Thus a first layer is obtained the thickness of which gradually decreases from a maximum thickness, at the edge of the optical element, to a minimum thickness at the edge of the substrate. In the cross-sectional view illustrated in FIG. 4, the sloped surface plane of the first layer thus corresponds to the plane joining the corners of the optical element and the substrate. The maximum thickness of this first layer, at the edge of the optical element, substantially corresponds to the thickness $e_p$ of the optical element: it may be slightly larger or slightly smaller. With this embodiment, progressive shrinkage of the adhesive is obtained, enough to reduce the mechanical stresses on the structure by a satisfactory amount.

Figure 5:
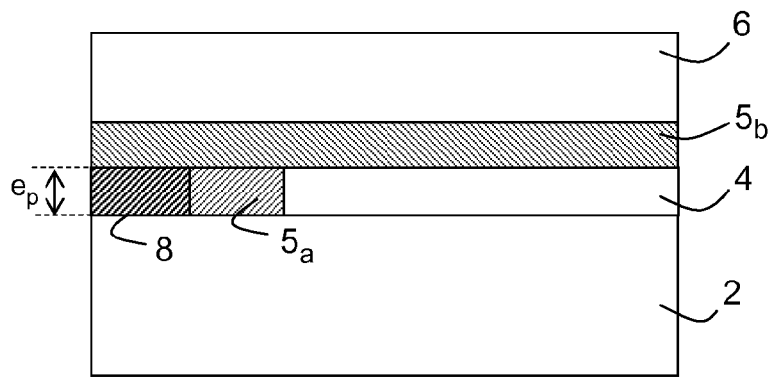

In the case where the space between the edge of the optical element and the edge of the substrate is wider, and as illustrated in FIG. 5, it is advantageous to produce a shim 7 on the substrate, placed at the edge of the substrate, and of substantially the same thickness as the optical element. It is then possible to form a first adhesive layer $5_a$ in a smaller space, between the edge of the optical element and the shim (more precisely the internal edge of the shim). The deposition of adhesive in the first step then consists in filling this space or trench, formed between the shim and the edge of the optical element, right to the top.

Advantageously, the shim 7 and the optical element will have the same composition. Consider firstly the case where the optical element is formed of a single optical film. An optical film is generally supplied in the form of a strip one face of which is adhesive, and the other face of which is coated with a protective film. It is thus possible to produce the optical film and the shim in the same operations (lamination and cutting for example). If the optical element is a film multilayer, it is possible to produce the shim and the optical element at the same time, in the same way, using the same steps (lamination/cutting). Typically, the various strips of optical film are adhesively bonded one on top of the other(s), by removing the protective film each time, and then the surplus parts are cut out and removed. The shim and the optical element remain on the substrate, advantageously coated with the protective film of the last film of the multilayer.

The protective film is advantageously preserved for the first adhesive deposition/curing step and removed afterward, before the second adhesive deposition/curing step.

Bonding the cover using two adhesive deposition/curing steps allows the amount the adhesive shrinks to be substantially reduced. The appearance of the electro-optical device thus encapsulated and its resistance to harsh environments are thus greatly improved.

As is clear from the above description, the protection process according to the invention means that, in the electro-optical device, there are two adhesive layers between the substrate and the protective cover. These two layers may have the same composition (same adhesive).

The presence of these two layers may be confirmed by suitable optical means, for example by scanning electron microscopy. The first layer will be present only on the substrate, in the peripheral zone encircling the optical element. The second layer will be located directly above the first layer and the surface of the optical element. The thickness of the first layer, at least in a part adjoining the optical element, will substantially correspond to the thickness of the optical element.

Depending on the manufacturing process embodiment used:
   the first layer will possibly have a substantially uniform thickness (case illustrated by FIGS. 3 and 5); or
   it will have a thickness that gradually decreases from the edge of the optical element, where the thickness will be maximal, to the edge of the substrate, where the thickness will be minimal (case illustrated in FIG. 4). At the edge of the optical element, this thickness may be slightly larger or slightly smaller than that of the optical element.

When the first layer has a uniform thickness, the first layer may extend from the edge of the optical element to the edge of the substrate, i.e. cover the entire peripheral zone (FIG. 3); or else may form only a border surrounding and adjoining the optical element (FIG. 5). In this case a shim will be positioned between the border and the edge of the substrate, and the shim, border and optical element will all have substantially the same thickness. The shim and the optical element will advantageously have the same composition, i.e. they will be formed by the same optical film or the same optical film multilayer.

The invention described above may be used to protect an external face of any electro-optical device, with the aim of protecting one or more optical films placed on this face and set back from the edge of a supporting substrate from external attack, and of stiffening and reinforcing the structure for the purpose of hardening the device for use in harsh environments. Although the invention may notably be used to protect the front side and/or the back side of a liquid-crystal display device, it is more generally applicable to any electro-optical device that is affected by thickness variations introduced by mechanical stresses.

The invention claimed is:

1. A process for protecting an external face of an electro-optical device, the external face comprising an optical element formed by an optical film or an optical film multilayer, said optical element being adhesively bonded to an optically transparent substrate and set back from an edge of the substrate, the process comprising:
   encapsulating the optical element by adhesively bonding an optically transparent protective cover to the external face, an area of the protective cover being substantially the same as an area of the substrate, wherein the adhesive bonding of the protective cover comprises depositing adhesive beforehand, said depositing adhesive being carried out in two steps, comprising:

a first step comprising deposition of uncured adhesive on a surface of parts of the substrate that extend beyond the optical element, followed by curing, thus forming a marginal adhesive strip that extends from an edge of the optical element to the edge of the substrate and that takes up a height difference between the substrate and the optical element; and a second step comprising deposition of uncured adhesive on a surface of an entire front side of the electro-optical device, adhesively bonding the protective cover, and curing.

2. The process according to claim 1, wherein the optical element includes a protective film on the external face, the protective film being kept in place on the optical element during the first step but removed before the second step.

3. The process according to claim 1, wherein, in the first step, the deposition of uncured adhesive on the surface of the parts of the substrate that extend beyond the optical element comprises bevelling the uncured adhesive using corners of the substrate and the optical element as supports, the marginal adhesive strip thus formed gradually taking up the height difference between the substrate and the optical element.

4. The process according to claim 1, wherein the first step further comprises producing a shim on the substrate, along the edge of the substrate, a height of the shim being substantially equal to a thickness of the optical element, thus forming a peripheral trench at the edge of the optical element, and filling the trench with the adhesive to a top of the trench.

5. The process according to claim 4, wherein the shim and the optical element have the same composition, and comprise, on their external face, a protective film that is kept in place on the shim and the optical element during the first step but removed before the second step.

6. The process according to claim 1, wherein the adhesive used in the first step is the same as the adhesive used in the second step.

7. An electro-optical device, an external face of which comprises an optical element formed by an optical film or an optical film multilayer, said element being adhesively bonded to a transparent optical substrate and set back therefrom, is hardened via encapsulation with a cover according to the protection process according to claim 1.

* * * * *